United States Patent Office 2,952,549
Patented Sept. 13, 1960

2,952,549
IMPROVEMENT OF WHEAT FLOUR

Otto Pfrengle and Christel Pietruck, Budenheim (Rhine), Germany

No Drawing. Filed Jan. 9, 1958, Ser. No. 707,850

4 Claims. (Cl. 99—91)

This invention relates to the improvement of comestible flours by the addition of calcium hydroxylapatite thereto.

Of the mineral substances that have been employed for the improvement of the baking properties of wheat and rye flours, the phosphates belong to those which have been longest known. According to Neuman-Pelshenke ("Brotgetreide und Brot"—Bread Grain and Bread, 4th edition, 1943, pages 533 and 534), no flour-improving effect is ascribed to the tertiary phosphates in general and to tricalcium phosphate in particular. In a more recent work ("Getreide, Mehl und Brot"—Grain, Flour and Bread, 1950, page 244), it is again expressly ascertained that tertiary calcium phosphate $Ca_3(PO_4)_2$ has no appreciable positive baking effect; its use for chemical flour processing occurs, it is stated, as a carrier substance for chemicals yielding oxygen.

It was found that calcium hydroxylapatite, of the approximate composition $(Ca_3P_2O_8)_3 \cdot Ca(OH)_2$, prepared particularly by precipitation from an aqueous solution, especially with flour that was not treated with oxidizing agents, showed a remarkable effect upon baking when this hydroxylapatite was available or added in a very voluminous form. With a favorable influencing of the porosity, a clear improvement of the volume yield results. The prerequisite here is that the calcium hydroxylapatite have a loosely measured bulk weight of less than 400 g./liter, preferably less than 350 g./liter.

The precipitated calcium hydroxylapatite is recovered from diluted solutions (with a solid-matter content between 1% and 25%, preferably between 5% and 15%) with a precipitation temperature of at most 70° C., preferably room temperature, as, for example, by slow stirring together of milk of lime with phosphoric acid, filtering off and drying at temperatures between 100° and 300° C., grinding and, in some cases, sifting.

Between 0.1% and 1%, preferably 0.15% to 0.5%, of the calcium hydroxylapatite should be added to the flour. The favorable effect occurs with wheat flour. According to the kind of flour, volume increases resulted on the order of magnitude up to about 10% of the control value. They are, therefore, clearly higher than could be achieved with the monocalcium orthophosphate hitherto used. Hydroxylapatite has the advantage over the acid calcium phosphates, that it does not affect the taste of the bread.

There are no physiological objections to the use of calcium hydroxylapatite, since this, after all, represents the principal component of the human skeleton and calcium orthophosphates are important and physiologically especially valuable natural mineral components of flour, the enrichment of which is altogether desirable.

The additives according to the invention can be used preferably alone, but also in common with other flour improvement agents, that is, with other mineral substances, malt flours or swelling flours, lecithin, monoglycerides, ascorbic acid, and others. For oily or pasty substances, calcium hydroxylapatite can serve as a carrier for the purpose of producing a powdery product.

*Example I*

By mixing milk of lime with diluted orthophosphoric acid at room temperature in a Ca:P proportion corresponding to the formula mentioned above, filtering, drying to 220° C., and grinding, an apatite "A" was obtained with a loosely measured bulk weight of 290 g./liter. Of this, 0.25% was added to an untreated wheat flour of type 550 (has an ash content of 0.550%). Then, from 80 g. of this flour, 2 g. of yeast, 0.8 g. of cooking salt and 44 cc. of water, a white bread was baked in an ordinary manner. The volumes achieved were 265 cc., 267 cc., and 269 cc., as compared to an average control value of 260 cc.; that is, the volume increase here amounted to 7 cc. or 2.7%.

Of the same phosphate "A," 0.25% was added to an untreated wheat flour of type 1050 (has an ash content of 1.050%) and in the baking the procedure was as above. As compared to a control value of 20 cc., baked goods resulted here of 245 cc., 245 cc., and 235 cc. (average, therefore, 242 cc.); that is, the volume increase here amounted to 22 cc. or 10%.

*Example II*

In a manner similar to that of Example I, supra, but with drying at 250° C. and extremely fine grading on a high-speed stud mill, the hydroxylapatite "B" was produced with a loosely measured bulk weight of 258 g./liter.

Of this phosphate "B," 0.25% was added to untreated wheat flour of type 550. With the baking experiments set forth in Example I, supra, volumes resulted of 280 cc., 281 cc., and 291 cc.; that is, on the average 285 cc. as compared with an average control value of 264 cc. The increase amounted, therefore, to 21 cc. or 8%.

When 0.25% of phosphate "B" was added to untreated wheat flour of type 1050, the baking experiment yielded 241 cc., 237 cc., and 233 cc., on the average, therefore, 237 cc. as compared with an average control value of 218 cc.; that is, an increase of 18 cc. or 8.3%.

The foregoing detailed description has been given for clearness of understanding only, and no unnecessary limitations should be understood therefrom, as modifications will be obvious to those skilled in the art.

We claim:

1. A comestible flour composition being free of added oxidants and having improved baking properties, which comprises a major proportion of wheat flour and 0.1–1% of a calcium hydroxylapatite additive having a bulk weight of less than 400 grams/liter, said additive serving to increase the volume of the baked product normally produced with said flour.

2. A comestible flour composition being free of added oxidants and having improved baking properties, which comprises a major proportion of wheat flour and 0.1–1% of a calcium hydroxylapatite additive having a bulk weight of less than 350 grams/liter, said additive serving to increase the volume of the baked product normally produced with said flour.

3. The composition of claim 1 wherein the composition contains 0.15–0.5% of said additive.

4. The composition of claim 2 wherein the composition contains 0.15–0.5% of said additive.

References Cited in the file of this patent

UNITED STATES PATENTS

| 1,689,697 | Thornton | Oct. 30, 1928 |
| 1,702,259 | Hill et al. | Feb. 19, 1929 |

FOREIGN PATENTS

| 22,434 of 1909 | Great Britain | July 28, 1910 |
| 17,941 of 1913 | Great Britain | Mar. 26, 1914 |

OTHER REFERENCES

Food Engineering, June 1953, page 70.

UNITED STATES PATENT OFFICE

CERTIFICATE OF CORRECTION

Patent No. 2,952,549                        September 13, 1960

Otto Pfrengle et al.

It is hereby certified that error appears in the above numbered patent requiring correction and that the said Letters Patent should read as corrected below.

Column 2, line 15, for "20 cc.," read -- 220 cc., --.

Signed and sealed this 5th day of September 1961.

(SEAL)
Attest:

ERNEST W. SWIDER                      DAVID L. LADD
Attesting Officer                        Commissioner of Patents

USCOMM-DC